United States Patent
Lopes (10) Patent No.: US 11,511,372 B2
(45) Date of Patent: Nov. 29, 2022

(54) TECHNIQUE TO IMPROVE THE PERFORMANCE OF A PUMP WITH A TRIMMED IMPELLER USING ADDITIVE MANUFACTURING

(71) Applicant: FLUID HANDLING LLC., Morton Grove, IL (US)

(72) Inventor: Jeffrey D. Lopes, Palatine, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 277 days.

(21) Appl. No.: 15/966,706

(22) Filed: Apr. 30, 2018

(65) Prior Publication Data

US 2018/0320703 A1 Nov. 8, 2018

Related U.S. Application Data

(60) Provisional application No. 62/491,325, filed on Apr. 28, 2017.

(51) Int. Cl.
*F04D 29/42* (2006.01)
*F04D 29/62* (2006.01)
(Continued)

(52) U.S. Cl.
CPC .............. *B23K 26/342* (2015.10); *B22F 7/08* (2013.01); *B22F 10/20* (2021.01); *B23K 10/027* (2013.01);
(Continued)

(58) Field of Classification Search
CPC . B23K 26/342; B23K 15/0086; B22F 3/1055; B22F 7/08; F04D 29/42;
(Continued)

(56) References Cited

U.S. PATENT DOCUMENTS 3,091,182 A * 5/1963 Anderson ............. F04D 29/445
415/197
3,289,598 A * 12/1966 Frederic ................ F04D 29/445
415/205
(Continued)

FOREIGN PATENT DOCUMENTS

| CN | 102606532 A | 7/2012 |
| GB | 2417988 B | 11/2009 |
| WO | 2016012399 A1 | 1/2016 |

OTHER PUBLICATIONS

Sciammerella, Federico, "Fabricating the future, layer by layer," FMA, thefabricator.com, Oct. 20, 2014, (5 pages). http://www.thefabricator.com/article/metalsmaterials/fabricating-the-future-layer-by-layer.

(Continued)

*Primary Examiner* — Topaz L. Elliott
*Assistant Examiner* — Aye S Htay
(74) *Attorney, Agent, or Firm* — Ware, Fressola, Maguire & Barber LLP (57) ABSTRACT

A pump features a trimmed impeller having a trimmed impeller diameter that is less than a standard full-sized diameter of a standard full-sized impeller for a standard full-sized casing, and having a circumferential outer edge; and a modified standard full-sized casing having dimensions corresponding to the standard full-sized casing and configured to house the trimmed impeller for pumping a fluid, having an outer peripheral wall, and having an inner annular volute portion between the circumferential outer edge of the trimmed impeller and the outer peripheral wall configured with a volume of material deposited using an additive manufacturing process so as to fill in vacant space otherwise caused by the trimmed impeller diameter being less than the (Continued)

standard full-sized impeller diameter. The additive manufacturing process is a directed energy deposition.

9 Claims, 7 Drawing Sheets

(51) Int. Cl.
    *B33Y 80/00* (2015.01)
    *B22F 10/20* (2021.01)
    *B33Y 10/00* (2015.01)
    *B23K 26/342* (2014.01)
    *B23K 15/00* (2006.01)
    *F04D 29/22* (2006.01)
    *B23K 10/02* (2006.01)
    *B23K 26/00* (2014.01)
    *B22F 7/08* (2006.01)
    *B23K 103/04* (2006.01)
    *B23K 103/10* (2006.01)

(52) U.S. Cl.
    CPC .......... *B23K 15/00* (2013.01); *B23K 15/0086* (2013.01); *B23K 15/0093* (2013.01); *B23K 26/0006* (2013.01); *B33Y 80/00* (2014.12); *F04D 29/2222* (2013.01); *F04D 29/426* (2013.01); *F04D 29/428* (2013.01); *F04D 29/628* (2013.01); *B23K 2103/05* (2018.08); *B23K 2103/10* (2018.08); *B33Y 10/00* (2014.12)

(58) Field of Classification Search
    CPC ............... F04D 29/422; F04D 29/4226; F04D 29/4233; F04D 29/428; F04D 29/4293; F04D 29/4253; F04D 29/4286; B33Y 10/00
    USPC ........................................................ 415/912
    See application file for complete search history.

(56) References Cited

U.S. PATENT DOCUMENTS

| | | |
|---|---|---|
| 4,004,541 A | 1/1977 | Onal |
| 4,213,742 A | 7/1980 | Henshaw |
| 4,589,175 A | 5/1986 | Arrigoni |
| 4,669,164 A | 6/1987 | Phelps |
| 6,464,128 B1 | 10/2002 | Messelling et al. |
| 6,464,454 B1 | 10/2002 | Kotkaniemi |
| 6,609,300 B2 | 8/2003 | Burgess |
| 8,006,381 B2 | 8/2011 | Haehnle et al. |
| 9,643,281 B1* | 5/2017 | Memmen ............ B23K 26/144 |
| 2002/0119038 A1 | 8/2002 | Abdallah |
| 2006/0182628 A1 | 8/2006 | Kim et al. |
| 2008/0056846 A1 | 3/2008 | Ahlroth et al. |
| 2013/0039769 A1 | 2/2013 | Giannozzi et al. |
| 2013/0115053 A1 | 5/2013 | Chien et al. |
| 2014/0140835 A1 | 5/2014 | Embrey et al. |
| 2014/0140836 A1* | 5/2014 | Embrey ............... F04D 29/026 415/204 |
| 2014/0169971 A1 | 6/2014 | Vedula et al. |
| 2014/0271162 A1* | 9/2014 | Karl .................... F04D 29/4286 415/200 |
| 2015/0017013 A1 | 1/2015 | Tozzi et al. |
| 2015/0060042 A1 | 3/2015 | Shilpiekandula et al. |
| 2015/0267543 A1 | 9/2015 | Gerber et al. |
| 2015/0354392 A1 | 12/2015 | Lipkin et al. |
| 2016/0158842 A1 | 6/2016 | Urbanski et al. |
| 2016/0243620 A1 | 8/2016 | Butcher |
| 2016/0363130 A1* | 12/2016 | Wang ....................... F04D 7/06 |
| 2017/0009773 A1 | 1/2017 | Marenco et al. |
| 2017/0082070 A1 | 3/2017 | Miller et al. |

OTHER PUBLICATIONS

"Energy Tips—Pumping Systems: Trim or Replace Impellers on Oversized Pumps," energy.gov, Pumping Systems Tip Sheet #7, Sep. 2006, (2 pages). https://energy.gov/sites/prod/files/2014/05/f16/trim_replace_impellers7.pdf.
"Improving Pumping System Performance: A Sourcebook for Industry," Industrial Technologies Program, peerlesspump.com, Second Edition, May 2006, (122 pages). http://www.peerlesspump.com/shared_docs/improving_performance.pdf.
English Abstract of CN102606532A.

* cited by examiner

FIG. 1: Example of a pump's performance curves when a pump using a common annular geometry and impellers that have had their diameters reduced to reduce it's output power.

Full Impeller

FIG. 2B
(PRIOR ART)

Full diameter pump with high efficiency and high power

FIG. 2A
(PRIOR ART)

pump which uses a full diameter impeller, a pump which uses a trimmed impeller with no modification to the area surrounding the impeller, a pump utilizing this invention wherein the area surrounding the trimmed impeller is filled with material Trimmed Impeller

FIG. 2D
(PRIOR ART)

Trimmed impeller pump with less power that is less efficient

FIG. 2C
(PRIOR ART)

pump which uses a full diameter impeller, a pump which uses a trimmed impeller with no modification to the area surrounding the impeller, a pump utilizing this invention wherein the area surrounding the trimmed impeller is filled with material Trimmed Impeller with modified annular geometry

FIG. 2F

Trimmed Impeller pump with less power that is equally efficient as the full impeller pump

FIG. 2E pump which uses a full diameter impeller, a pump which uses a trimmed impeller with no modification to the area surrounding the impeller, a pump utilizing this invention wherein the area surrounding the trimmed impeller is filled with material

FIG. 4: The DED
(PRIOR ART)

TECHNIQUE TO IMPROVE THE PERFORMANCE OF A PUMP WITH A TRIMMED IMPELLER USING ADDITIVE MANUFACTURING

CROSS-REFERENCE TO RELATED APPLICATION

This application claims benefit to provisional patent application Ser. No. 62/491,325, filed 28 Apr. 2017, which is hereby incorporated by reference in its entirety.

BACKGROUND OF THE INVENTION

1. Field of the Invention

The present invention relates to a pump; and more particularly to a pump having a trimmed impeller.

2. Brief Description of Related Art

In order to minimize the amount of stock and permutations of impellers and volutes a pump company carries, it will reduce the diameter of an impeller to meet customer performance demands when those demands are less than what a pump is capable of pumping with an impeller at its full design diameter. This is called "Impeller Trimming" and is very common in the pumping industry. However, the pump casing is held constant and only the impeller is modified.

Some shortcomings of the known devices include the following: The problem with impeller trimming is that the volute, diffuser vanes, or any other annular geometry is designed to match the fully sized impeller, that is, it is designed in such a way as to have a maximum efficiency when a fully sized impeller is installed and rotates at a given rotational speed. When the impeller is trimmed and the annular geometry is unchanged the efficiency of the pump almost always decreases.

In view of this, there is a need in the pump industry for a better way to make a pump having a trimmed impeller using a standard full-sized casing, e.g., that is more efficient.

SUMMARY OF THE INVENTION

In summary, the present invention provides a new and unique technique to fill in the volute, or other annular geometry, of a pump that uses a common casing and a trimmed impeller such that the annular geometry matches the trimmed impeller's hydrodynamic properties in order to improve the efficiency of a pump which requires a trimmed impeller instead of a full diameter impeller.

SPECIFIC EMBODIMENTS

According to some embodiments, the present invention may take the form of a pump featuring a trimmed impeller and a modified standard full-sized casing.

The trimmed impeller may include a trimmed impeller diameter that is less than a standard full-sized diameter of a standard full-sized impeller for a standard full-sized casing, and having a circumferential outer edge.

The modified standard full-sized casing may include dimensions corresponding to the standard full-sized casing and configured to house the trimmed impeller for pumping a fluid, include an outer peripheral wall, and include an inner annular volute portion between the circumferential outer edge of the trimmed impeller and the outer peripheral wall configured with a volume of material deposited using an additive manufacturing process so as to fill in vacant space otherwise caused by the trimmed impeller diameter being less than the standard full-sized impeller diameter.

The pump may also include one or more of the following features:

By way of example, the additive manufacturing process may include, or take the form of, a directed energy deposition.

The volute may include an impeller cut-away that has an extended impeller cut-away portion formed with another corresponding volume of material deposited using the additive manufacturing process.

The Method

According to some embodiments, the present invention may take the form of a method of making a pump having trimmed impeller using a standard full-sized casing, e.g., having steps of:

configuring a trimmed impeller having a trimmed impeller diameter that is less than a standard full-sized diameter of a standard full-sized impeller for a standard full-sized casing, and having a circumferential outer edge; and configuring a modified standard full-sized casing having dimensions corresponding to the standard full-sized casing and configured to house the trimmed impeller for pumping a fluid, having an outer peripheral wall, and having an inner annular volute portion between the circumferential outer edge of the trimmed impeller and the outer peripheral wall configured with a volume of material deposited using an additive manufacturing process so as to fill in vacant space otherwise caused by the trimmed impeller diameter being less than the standard full-sized impeller diameter.

The method may also include one or more of the following:

using a directed energy deposition as the additive manufacturing process;

forming an impeller cut-away that has an extended impeller cut-away portion with a corresponding volume of material deposited using the additive manufacturing process.

BRIEF DESCRIPTION OF THE DRAWING

The drawing, which is not necessarily drawn to scale, includes the following Figures:

FIG. 2 includes FIGS. 2A thru 2F, where FIGS. 2A and 2B show a first pump which uses a full diameter impeller, which is known in the art; where FIGS. 2B and 2D show a second pump which uses a trimmed impeller with no modification to the area surrounding the trimmed impeller, which is known in the art; and where FIGS. 2E and 2F show a third pump wherein the area surrounding the trimmed impeller is filled with material, e.g., using an additive manufacturing process, according to some embodiments of the present invention.

FIG. 3 includes FIGS. 3A thru 3D, where

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Consistent with that set forth above, it is general practice in the pump industry to use the same pump casing and alter or "trim" the impeller that is designed for that pump casing in order to cover a wide range of pumping performance requirements. This allows for a reduction in the inventory that a company must carry by a significant amount. For example, the pump whose performance curves are shown in FIG. 1 uses one pump casing and allows the user to choose from several different impeller diameters to meet the requirements of the application for which they require a pump.

Although very efficient from an inventory standpoint, the drawback is that the efficiency of a centrifugal pump decreases the further the impeller is trimmed. This is due to the fact that the geometry of the volute, or other annular geometry, is designed to match the fully sized impeller for maximum efficiency. When the impeller is trimmed the performance characteristics of the pump are changed and, in general, the efficiency of the pump is reduced because the geometry of the annular area around the trimmed impeller is not matched to the trimmed impeller geometry.

Figure 1:
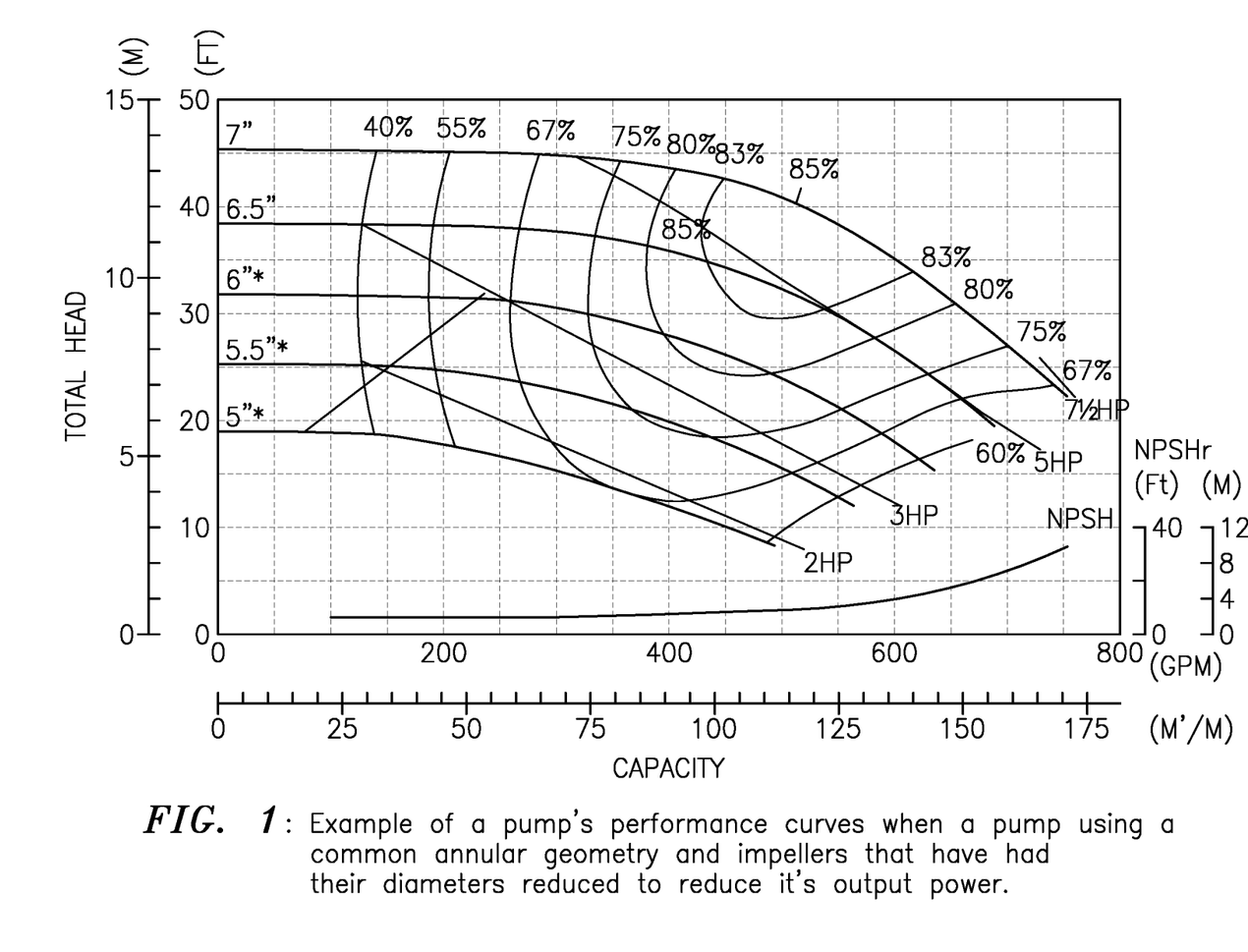
FIG. 1 is a graph showing total head versus capacity, and provides an example of a pump's performance curves when a pump using a common annular geometry and impellers that have had their diameters reduced to reduce its output power.

FIG. 1 shows performance curves from a pump which uses the same casing and annular geometry with a fully sized 7" diameter impeller (curve 1a) down to a 5" trimmed impeller (curve 1b); for every reduction in impeller diameter there is also an associated reduction in efficiency which is mostly caused by recirculation of the pumped fluid throughout the annulus of the impeller. For example in FIG. 1, at the best efficiency point, the full diameter impeller pump has a best efficiency point of 85% (point 1a'), whereas the fully trimmed version has a maximum efficiency of only 67% (point 1b').

Additive Manufacturing

Additive manufacturing techniques now exist that will allow for material to be deposited onto the volute, or any other annular geometry's surface. One such technique is Directed Energy Deposition (DED). This technique combines a multi-axis computer controlled arm, a nozzle which will blow metal powder according to instructions from a computer, and a laser central to the nozzle which fires according to instructions from a computer to melt the blown metal powder onto the desired locations.

Figure 4:
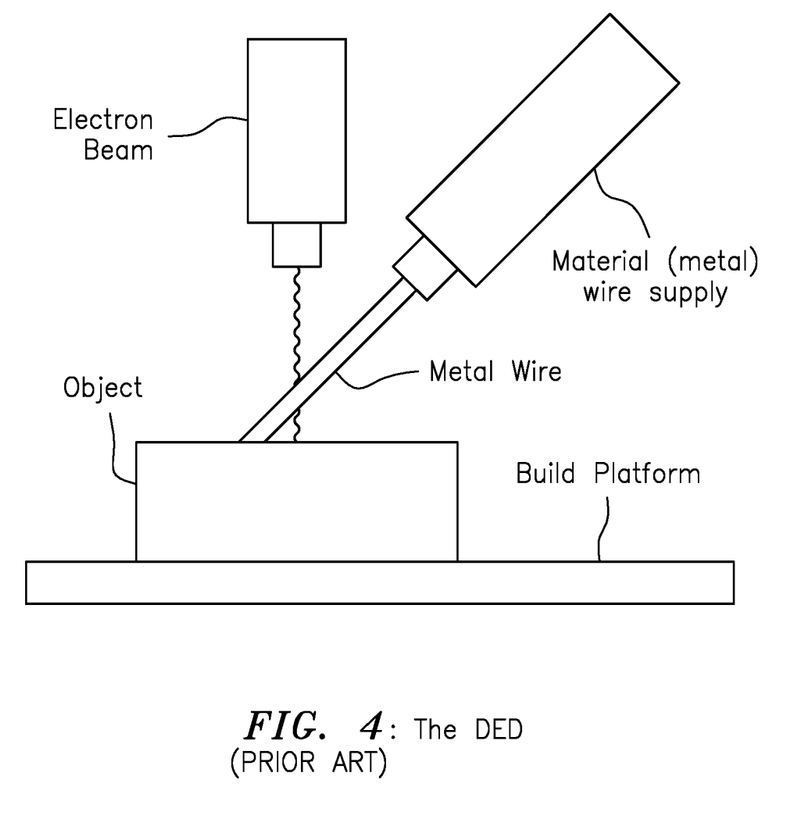
FIG. 4 shows an example of apparatus for implementing additive manufacturing using directed energy deposition that is known in the art.

Techniques like DED allow a company to continue to benefit from the reduction in inventory of only having one casting for each pump size but, by adding material to the annular area of the impeller onto the casing in the appropriate areas when the impeller is trimmed, they can significantly improve the efficiency of the trimmed impeller pump. Noting the example from FIG. 1 and the 18% decrease in overall efficiency at the best efficiency point, the efficiency decreases can be substantial. Filling in the areas and matching the volute to the trimmed impeller would reduce the loss in efficiency and could potentially prevent or improve it. The exact amount would depend on many factors. See the further discussion of AM below and that shown in FIG. 4.

The principles for matching the annular geometry of an impeller to maximize the performance of a pump are well established analytically, experimentally, and numerically. The design of the filled annuli could be determined and optimized via classical methods and then, using a method that adds material to an existing structure such as DED described above, when a trimmed impeller is required its efficiency could be improved by adding material in the spaces that are necessary in order to transform the common cast pump casing (optimized for the fully sized impeller) into a modified pump casing that is optimized to match the fluid dynamics of the trimmed impeller.

FIG. 2

FIG. 2 shows an example embodiment of this invention. FIG. 2 has three pumps 2 (FIGS. 2A, 2B); 2' (FIGS. 2C, 2D); and 2" (FIGS. 2E, 2F).

Figure 2A:
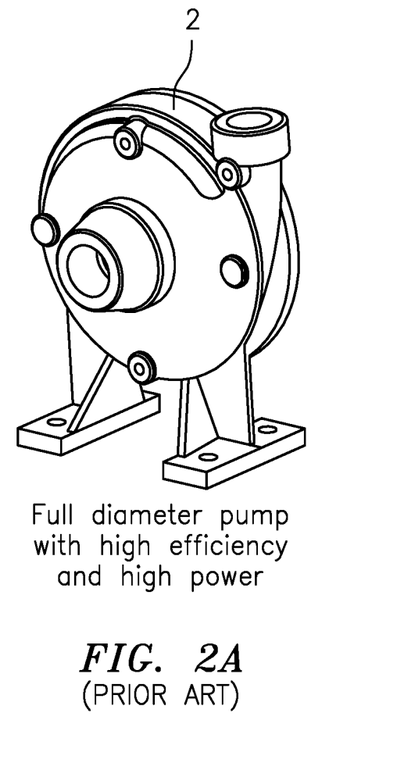
Figure 2B:
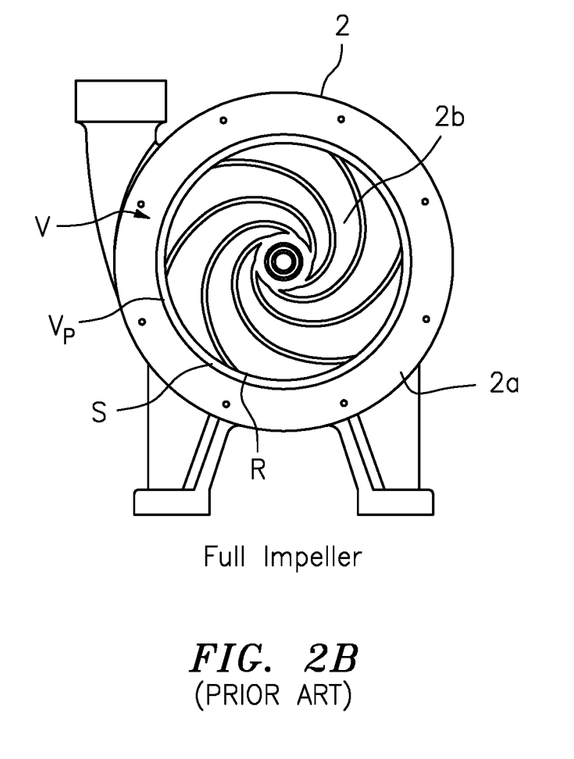
FIGS. 2B, 2D and 2F are cross-sectional view of FIGS. 2A, 2C and 2E; where

In FIGS. 2A and 2B, the pump 2 is composed of the standard casing 2a whose internal surfaces are designed to match with the full size impeller 2b which is also a part of the full size pump 2. In FIGS. 2A and 2B, the pump 2 has a volute V having an volute portion $V_P$ with a circumferential space S left over, e.g., between the outer circumferential edge or rim R of the full size impeller 2b and the outer peripheral wall forming the volute portion $V_P$. Compare that shown in FIGS. 2F, 3B and 3D below. In operation, the full diameter pump 2 runs at a high efficiency and high power.

Figure 2C:
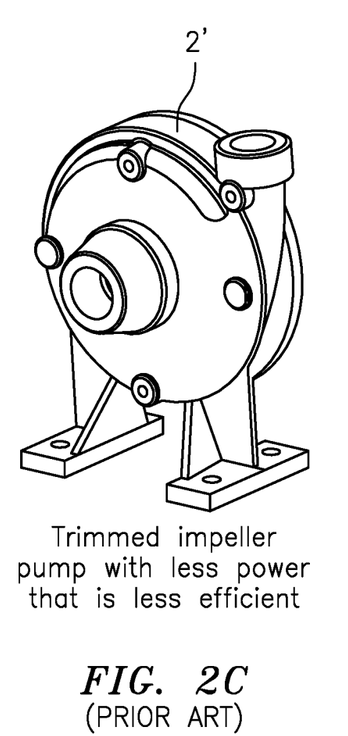
Figure 2D:
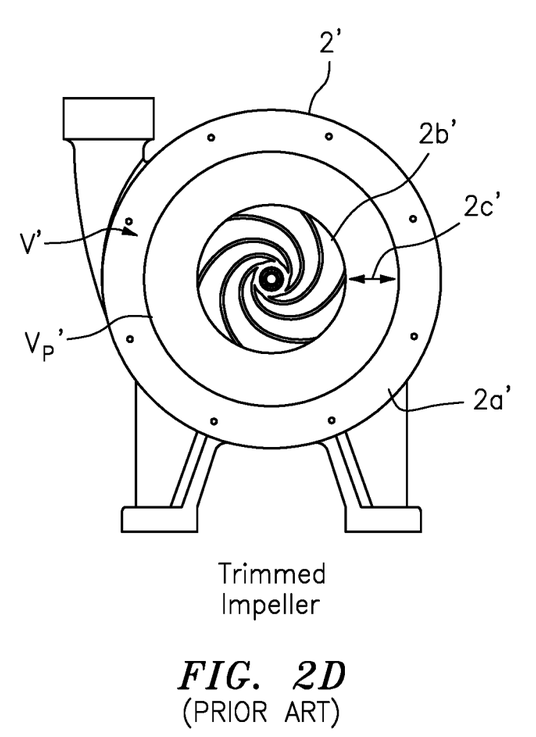

In FIGS. 2C and 2D, the second pump 2' has the standard casing 2a' whose internal surfaces are designed to match the full size impeller but has a trimmed impeller 2b' whose diameter is less than the diameter of the full size impeller, e.g., like that shown in FIG. 2A. In FIGS. 2C and 2D, the pump 2' has a volute V' having a volute portion $V_P'$ with a vacant space 2c' left over from the trimming of the impeller 2b'. Because of this, the second pump 2' has a relatively low efficiency value which is mostly due to vacant space 2c' left over from the trimming of the impeller 2b'. As one skilled in the art would appreciate, the size of the vacant space 2c' will depend on the difference between the diameter of the full size impeller 2b and the corresponding diameter of the trimmed impeller 2b', which itself depends on the particular application of the corresponding pump. In comparison to the full diameter pump 2 shown in FIGS. 2A and 2B, the trimmed impeller pump 2' has less power and is less efficient.

Figure 2E:
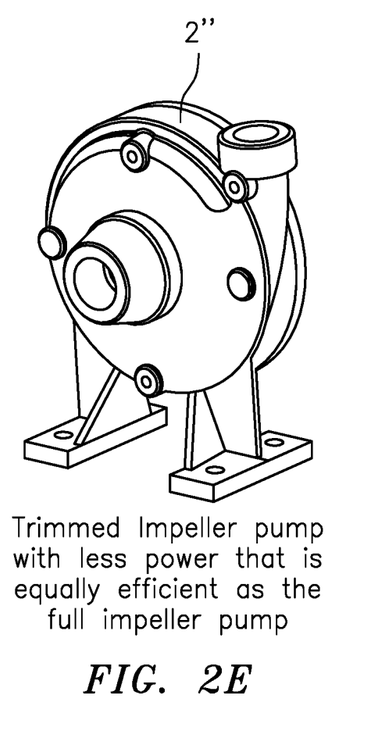
Figure 2F:
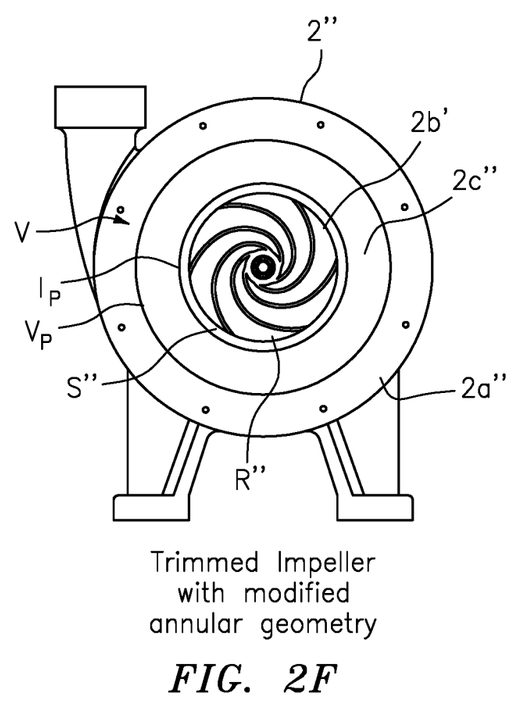

By way of example, FIGS. 2E and 2F shows the third pump 2" having a trimmed impeller 2b' with a modified annular geometry, similar to that shown in FIG. 2D; however, the casing has a corresponding modification, e.g., according to some embodiments of the present invention. For example, while this pump 2" has the trimmed impeller 2b', it uses a modified casing 2a" in which the vacant space 2c' in the pump 2' (see FIG. 2C) has been filled with, e.g., additive material, such that a new internal surface 2c" is created by adding a volume of material to the standard casing that is designed and added to maximize the performance of the pump 2" with the reduced diameter impeller installed. In other words, in FIGS. 2E and 2F the pump 2"

has a volute V" having an inner annular volute portion $V_P$" that has been filled with the additive material, such that the new internal surface 2c" is created, along with a small space S" left over between the outer edge or rim R" of the trimmed impeller 2b' and the inner portion IP of the new internal surface 2c". The third pump 2" shown in FIGS. 2E and 2F has a higher pumping efficiency than the second pump 2' shown in FIGS. 2C and 2D. In effect, the trimmed impeller pump 2" shown in FIGS. 2E and 2F has less power but is equally efficient as the full impeller pump 2 shown in FIGS. 2A and 2B.

FIG. 3

Figure 3A:
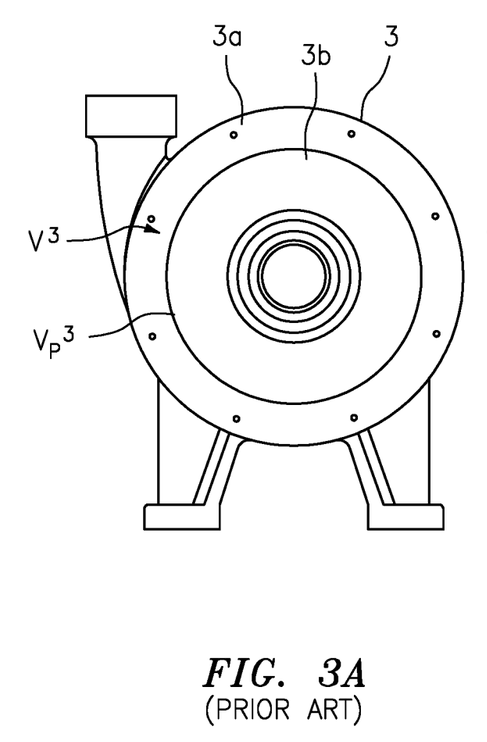
FIG. 3A shows a cross-section of a pump, which is known in the art; where
Figure 3B:
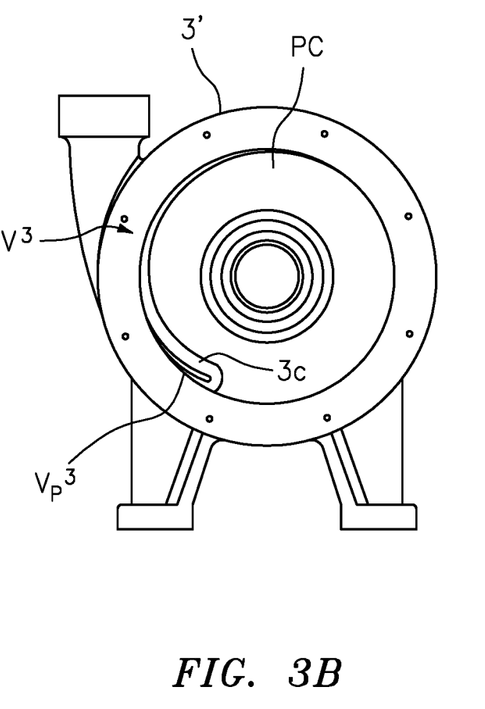
FIG. 3B shows the pump in FIG. 3A having a modified standard full-sized casing, according to some embodiments of the present invention; where
Figure 3C:
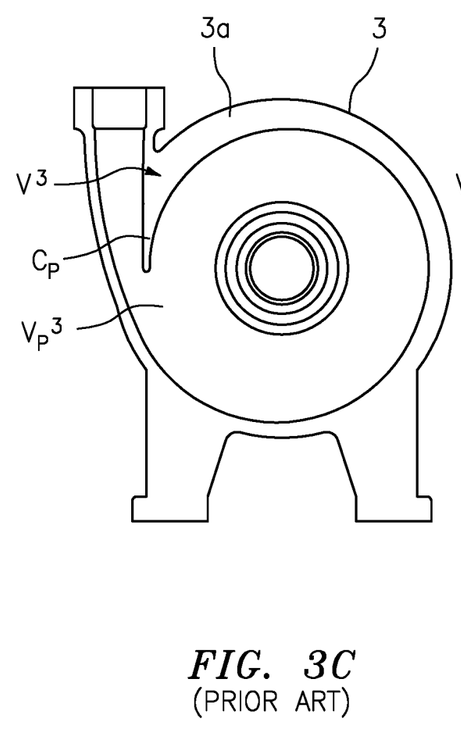
FIG. 3C shows a different cross-section of the pump in FIG. 3A, which is known in the art; where
Figure 3D:
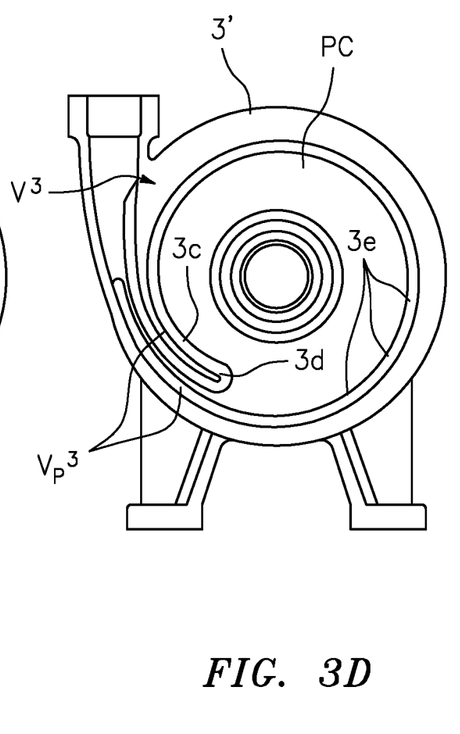
FIG. 3D shows the pump in FIG. 3B having the modified standard full-sized casing along a different cross-sectional plane, according to some embodiments of the present invention.

FIG. 3 includes FIGS. 3A, 3B, 3C and 3D, where FIGS. 3B and 3D show an alternative embodiment of how the present invention may also be implemented in practice.

For example, FIG. 3A shows a pump 3 having a pump casing 3a that may be used to optimize the performance of a full sized impeller 3b with an internal cross section shown in more detail in FIG. 3C, which are known in the art. (It is noted that FIGS. 3B and 3D shown different cross-sectional view of the same embodiment.) The pump 3 has a cutwater portion $C_P$. as shown in FIG. 3C.

In contrast to that shown in FIG. 3A, FIG. 3B shows a similar sized pump casing like that shown in FIG. 3A, which has been modified per this invention to optimize the performance of a trimmed impeller (e.g., like impeller 2b') after it has been trimmed for the purpose of dropping its flow rate and pressure output in the pumping chamber PC. In FIG. 3B, the modifications indicated by 3c are also shown in a corresponding cross sectional view in FIG. 3D, along with other modifications 3d and 3e to other volute portions $V_P^3$ of the volute $V^3$. By way of example, this embodiment in FIGS. 3B and 3D represents an implementation of the present invention on a particular pump, and its exact geometry may vary depending on the particular situation or application of the pump. In this embodiment, consistent with that shown in FIG. 3D, the original impeller cutwater (e.g., like that shown in FIG. 3A) has been extended by the modifications indicated by reference labels 3c and 3d, and the shape of the pump's volute $V^3$ has been changed and extended by the modifications indicated by reference labels 3e. These changes/modifications represent the addition material that are made to reduce recirculation in the pump after the trimmed impeller has been installed into the pump so that its efficiency is improved.

In particular, consistent with that shown in FIGS. 3B and 3D, the volute portion $V_P^3$ of a pump 3' according to the present invention may be configured or formed with the corresponding volume of added material or modification 3c, 3d, 3e that is deposited, e.g., using the additive manufacturing process so as to fill in the vacant space otherwise caused by the trimmed impeller diameter being less than the standard full-sized impeller diameter.

By way of example, although the DED technique is mentioned as one possible way to add the material to the full sized casing, this is not the only technique which would be capable of building this invention and is mentioned only as an example and not meant to be a part of this invention, e.g., consistent with that set forth herein.

Additive Manufacturing (AM)

Techniques for implementing additive manufacturing (AM) are known in the art, and the scope of the invention is not intended to be limited to any particular type or kind thereof either now known or later developed in the future.

The following is a brief description of techniques for implementing AM that are known in the art.

By way of example, AM is understood to be a transformative approach to industrial production that enables the creation of lighter, stronger parts and systems. It is another technological advancement made possible by the transition from analog to digital processes. In recent decades, communications, imaging, architecture and engineering have all undergone their own digital revolutions. Now, AM can bring digital flexibility and efficiency to manufacturing operations.

By way of example, AM may be implemented using data computer-aided-design (CAD) software or 3D object scanners to direct hardware to deposit material, layer upon layer, in precise geometric shapes. As its name implies, AM adds material to create an object. In contrast, when one creates an object by traditional means, it is often necessary to remove material through milling, machining, carving, shaping or other means.

Although the terms "3D printing" and "rapid prototyping" may typically be used to discuss AM, each process is actually understood to be a subset of AM in general. AM has been around for several decades. In the right applications, AM delivers a trifecta of improved performance, complex geometries and simplified fabrication. As a result, opportunities abound for those who actively embrace AM. The term "AM" references technologies that grow three-dimensional objects one superfine layer at a time. Each successive layer bonds to the preceding layer of melted or partially melted material. It is possible to use different substances for layering material, including metal powder, thermoplastics, ceramics, composites, glass and even edibles like chocolate.

By way of example, objects may be digitally defined by the computer-aided-design (CAD) software that is used to create .stl files that essentially "slice" the object into ultra-thin layers. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

The journey from .stl file to 3D object is revolutionizing manufacturing. Gone are the intermediary steps, like the creation of molds or dies, that cost time and money. There are a variety of different AM processes, e.g., including the following:

Material Extrusion: Material extrusion is one of the most well-known AM processes. Spooled polymers are extruded, or drawn through a heated nozzle mounted on a movable arm. The nozzle moves horizontally while the bed moves vertically, allowing the melted material to be built layer after layer. Proper adhesion between layers occurs through precise temperature control or the use of chemical bonding agents.

Directed Energy Deposition (DED): The process of DED is similar to material extrusion, although it can be used with a wider variety of materials, including polymers, ceramics and metals. Consistent with that shown in FIG. 5, an electron beam gun or laser mounted on a four- or five-axis arm melts either wire or filament feedstock or powder. According to some embodiments, the DED process may be implemented to add the material/modifications to the volute portions, e.g., consistent with that disclosed herein, and according to some embodiments of the present invention.

Material Jetting: With material jetting, a print head moves back and forth, much like the head on a 2D inkjet printer. However, it typically moves on x-, y- and z-axes to create 3D objects. Layers harden as they cool or are cured by ultraviolet light.

Binder Jetting: The binder jetting process is similar to material jetting, except that the print head lays down alternate layers of powdered material and a liquid binder.

Sheet Lamination: Laminated object manufacturing (LOM) and ultrasonic AM (UAM) are two sheet lamination methods. LOM uses alternate layers of paper and adhesive, while UAM employs thin metal sheets conjoined through ultrasonic welding. LOM excels at creating objects ideal for visual or aesthetic modeling. UAM is a relatively low-temperature, low-energy process used with various metals, including titanium, stainless steel and aluminum.

Vat Polymerization: With vat photopolymerization, an object is created in a vat of a liquid resin photopolymer. A process called photopolymerization cures each microfine resin layer using ultraviolet (UV) light precisely directed by mirrors.

Powder Bed Fusion: Powder Bed Fusion (PBF) technology is used in a variety of AM processes, including direct metal laser sintering (DMLS), selective laser sintering (SLS), selective heat sintering (SHS), electron beam melting (EBM) and direct metal laser melting (DMLM). These systems use lasers, electron beams or thermal print heads to melt or partially melt ultra-fine layers of material in a three-dimensional space. As the process concludes, excess powder is blasted away from the object.

AM Technologies

Sintering is the process of creating a solid mass using heat without liquefying it. Sintering is similar to traditional 2D photocopying, where toner is selectively melted to form an image on paper.

Within DMLS, a laser sinters each layer of metal powder so that the metal particles adhere to one another. DMLS machines produce high-resolution objects with desirable surface features and required mechanical properties. With SLS, a laser sinters thermoplastic powders to cause particles to adhere to one another.

In contrast, materials are fully melted in the DMLM and EBM processes. With DMLM, a laser completely melts each layer of metal powder while EBM uses high-power electron beams to melt the metal powder. Both technologies are ideal for manufacturing dense, non-porous objects.

Stereolithography (SLA) uses photopolymerization to print ceramic objects. The process employs a UV laser selectively fired into a vat of photopolymer resin. The UV-curable resins produce torque-resistant parts that can withstand extreme temperatures.

AM Materials

It is possible to use many different materials to create 3D-printed objects. AM technology fabricates jet engine parts from advanced metal alloys, and it also creates chocolate treats and other food items.

By way of examples, AM materials include the following:

Thermoplastics: To date, thermoplastic polymers remain the most popular class of AM materials. Acrylonitrile butadiene styrene (ABS), polylactic acid (PLA) and polycarbonate (PC) each offer distinct advantages in different applications. Water-soluble polyvinyl alcohol (PVA) is typically used to create temporary support structures, which are later dissolved away.

Metals: Many different metals and metal alloys are used in AM, from precious metals like gold and silver to strategic metals like stainless steel and titanium. The AM process for implementing the present invention disclosed herein may include using a metal that is similar or corresponds to the metal of the full sized casing.

Ceramics: A variety of ceramics have also been used in AM, including zirconia, alumina and tricalcium phosphate. Also, alternate layers of powdered glass and adhesive are baked together to create entirely new classes of glass products.

Biochemicals: Biochemical healthcare applications include the use of hardened material from silicon, calcium phosphate and zinc to support bone structures as new bone growth occurs. Researchers are also exploring the use of bio-inks fabricated from stem cells to form everything from blood vessels to bladders and beyond.

AM Advantages

AM allows the creation of lighter, more complex designs that are too difficult or too expensive to build using traditional dies, molds, milling and machining.

AM also provides for rapid prototyping. Since the digital-to-digital process eliminates traditional intermediate steps, it is possible to make alterations on the run. When compared to the relative tedium of traditional prototyping, AM offers a more dynamic, design-driven process.

Whether AM is used for prototyping or production, lead times are frequently reduced. Lead times for certain jet engine parts have been reduced by a year or more. Also, parts once created from multiple assembled pieces are now fabricated as a single, assembly-free object.

In designing everything from bridges to skyscrapers, engineers have long sought to minimize weight while maximizing strength. With AM, designers realize the dream of utilizing organic structures to greatly reduce the weight of objects.

Advantages of using the AM process for implementing the present invention disclosed herein may include substantially improved pump efficiency when comparing the pump using the trimmed impeller with the added material according to the present invention in relation to the prior art pump disclosed in FIGS. 2C and 2D which does not.

Complex Geometries

The AM technology enables engineers to design parts that incorporate complexity that is not possible using other methods. Intricate features, such as conformal cooling passages, can be incorporated directly into a design. Parts that previously required assembly and welding or brazing of multiple pieces can now be grown as a single part, which makes for greater strength and durability. Designers are no longer restricted to the limitations of traditional machines and can create parts with greater design freedom.

Pump casing typically come in two halves, and the AM process may be implementing according to the present invention to add material to the volute portions of each half.

Time Savings

AM is ideal for getting prototypes made quickly. Parts are manufactured directly from a 3D CAD file, which eliminates the cost and lengthy process of having fixtures or dies created. Plus, changes can be made mid-stream with virtually no interruption in the process.

Weight Savings

By incorporating organic structures into designs, designers can eliminate substantial weight while maintaining the part's strength and integrity.

Directed Energy Deposition (DED)

DED covers a range of terminologies, e.g., including: 'Laser engineered net shaping, directed light fabrication, direct metal deposition, 3D laser cladding'. It is a more complex printing process commonly used to repair or add additional material to existing components (Gibson et al., 2010), e.g., like pump casings.

A typical DED machine consists of a nozzle mounted on a multi axis arm, which deposits melted material onto the specified surface, where it solidifies. The process is similar in principle to material extrusion, but the nozzle can move in multiple directions and is not fixed to a specific axis. The material, which can be deposited from any angle due to 4 and 5 axis machines, is melted upon deposition with a laser or electron beam. The process can be used with polymers, ceramics but is typically used with metals, in the form of either powder or wire.

Typical applications include repairing and maintaining structural parts.

By way of example, FIG. 5 shows apparatus for implementing Direct Energy Deposition—Step by Step—as follows:
1. A 4 or 5 axis arm with nozzle moves around a fixed object.
2. Material is deposited from the nozzle onto existing surfaces of the object.
3. Material is either provided in wire or powder form.
4. Material is melted using a laser, electron beam or plasma arc upon deposition.
5. Further material is added layer by layer and solidifies, creating or repairing new material features on the existing object.

The DED process uses material in wire or powder form. Wire is less accurate due to the nature of a pre-formed shape but is more material efficient when compared to powder (Gibson et al., 2010), as only required material is used. The method of material melting varies between a laser, an electron beam or plasma arc, all within a controlled chamber where the atmosphere has reduced oxygen levels. With 4 or 5 axis machines, the movement of the feed head will not change the flow rate of material, compared to fixed, vertical deposition (Gibson et al., 2010).

Whilst in most cases, it is the arm that moves and the object remains in a fixed position, this can be reversed and a platform could be moved instead and the arm remain in a fixed position. The choice will depend on the exact application and object being printed. Material cooling times are very fast, typically between 1000-5000 degrees Celsius/ second (Gibson et al., 2010). The cooling time will in turn affect the final grain structure of the deposited material, although the overlapping of material must also be considered, where the grain structure is changed as the overlapping can cause re-melting to occur, resulting in a uniform but alternating micro-structure. Typical layer thicknesses of 0.25 mm to 0.5 mm (Gibson et al., 2010).

AM Patent Documents

The following is a list of patent documents, e.g., including US patent applications and issued US patent, that disclose AM technology, are all incorporated by reference in their entirety, and include the following:

U.S. Pat. Nos. 4,575,330; 8,029,501; 9,884,455; 9,450,311 and 9,937,665.

US Patent publication nos. 2004/0230117; 2007/0084839; 2012/0041428; 2015/0174822; 2016/0298213; 2017/0021565; 2017/0028631; 2017/0182561; 2017/0182595; 2017/0184108; 2017/0225403; 2017/0261087; 2017/0287685; and 2017/0312821.

The incorporation by references of the aforementioned patent documents include the incorporation by reference of all the US patent applications and issued US patent either referenced or cited therein.

THE SCOPE OF THE INVENTION

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A method of making a pump having a full-sized casing configured to house a trimmed impeller for pumping a fluid, the trimmed impeller having a circumferential outer edge with a trimmed diameter, the full-sized casing having an outer peripheral wall with a full-sized diameter and an inner annular volute portion between the circumferential outer edge of the trimmed impeller and the outer peripheral wall of the full-sized casing with a vacant space left over and caused by the trimmed diameter of the circumferential outer edge of the trimmed impeller being less than the full-sized diameter of the outer peripheral wall of the full-sized casing,
characterized in that the method comprises forming, on the full-sized casing, a volute having a volute portion with layered modifications by depositing a volume of material using an additive manufacturing process on the inner annular volute portion so as to fill in part of the vacant space and create a new internal surface with an inner portion along with a remaining space left over between the circumferential outer edge of the trimmed impeller and the inner portion of the new internal surface deposited using the additive manufacturing process.

2. A method according to claim 1, wherein the method comprises using a directed energy deposition as the additive manufacturing process.

3. A method according to claim 1, wherein the method comprises forming an impeller cut-away on a volute of the full-sized casing that has an extended impeller cut-away portion with a corresponding volume of material deposited using the additive manufacturing process.

4. A method of making a full-sized casing configured to house a trimmed impeller for pumping a fluid, the trimmed impeller having a circumferential outer edge with a trimmed diameter, the full-sized casing having an outer peripheral wall with a full-sized diameter and an inner annular volute portion between the circumferential outer edge of the trimmed impeller and the outer peripheral wall of the full-sized casing with a vacant space left over and caused by the trimmed diameter of the circumferential outer edge of the trimmed impeller being less than the full-sized diameter of the outer peripheral wall of the full-sized casing, characterized in that the method comprises forming, on the full-sized casing, a volute having a volute portion with layered modifications by depositing a volume of material using an additive manufacturing process on the inner annular volute portion so as to fill in part of the vacant space and create a new internal surface with an inner portion along with a remaining space left over between the circumferential outer edge of the trimmed impeller and the inner portion of the new internal surface deposited using the additive manufacturing process.

5. A method according to claim 4, wherein the method comprises using a directed energy deposition as the additive manufacturing process.

6. A method according to claim 4, wherein the method comprises forming an impeller cut-away on a volute of the full-sized casing that has an extended impeller cut-away portion with a corresponding volume of material deposited using the additive manufacturing process.

7. A full-sized casing configured to house a trimmed impeller for pumping a fluid, the trimmed impeller having a circumferential outer edge with a trimmed diameter, the full-sized casing having an outer peripheral wall with a full-sized diameter and an inner annular volute portion between the circumferential outer edge of the trimmed impeller and the outer peripheral wall of the full-sized casing with a vacant space left over and caused by the trimmed diameter of the circumferential outer edge of the trimmed impeller being less than the full-sized diameter of the outer peripheral wall of the full-sized casing, characterized in that the full-sized casing comprises a volute having a volute portion with layered modifications formed by depositing a volume of material using an additive manufacturing process on the inner annular volute portion so as to fill in part of the vacant space and create a new internal surface with an inner portion along with a remaining space left over between the circumferential outer edge of the trimmed impeller and the inner portion of the new internal surface deposited using the additive manufacturing process.

8. A full-sized casing according to claim 7, wherein the additive manufacturing process is a directed energy deposition.

9. A full-sized casing according to claim 7, wherein the full-sized casing has a volute that includes an impeller cut-away that has an extended impeller cut-away portion formed with a corresponding volume of material deposited using the additive manufacturing process.

\* \* \* \* \*